UNITED STATES PATENT OFFICE.

JAMES DEWAR, OF CAMBRIDGE, ENGLAND.

SEPARATION OF GASES.

No. 879,129.        Specification of Letters Patent.        Patented Feb. 11, 1908.

Original application filed April 25, 1905, Serial No. 257,352. Divided and this application filed January 4, 1906. Serial No. 294,669.

*To all whom it may concern:*

Be it known that I, JAMES DEWAR, a subject of the King of Great Britain, residing at 1 Scroope Terrace, Cambridge, England, professor of chemistry, have invented certain new and useful Improvements in Separation of Gases, of which the following is a specification.

This invention, which constituted a part of my application Serial No. 257,352, dated 25th April 1905, relates to an improved method of separating gases, by aid of charcoal.

I have discovered that cooled charcoal exercises a selective action of absorption on mixtures of gases or vapors, absorbing some in preference to others, in such manner that practical separation may be obtained in one or several treatments. As an example of this, when dry air in excess of that required for saturation of the charcoal is passed over it at $-180°$ C., the mean composition of the absorbed gases will be 56 per cent. of oxygen and 44 per cent. of nitrogen; further fractionation may be obtained of such absorbed gas, by slowly raising the temperature of the charcoal, when the air absorbed by the charcoal will be expelled slowly and may be collected in separate fractions each richer in oxygen than the preceding one. In this manner oxygen or nitrogen may be obtained. By a similar proceeding to the above, fractional separation of mixtures of gases and vapors is possible. Thus by cooling charcoal to $-80°$ C., and passing coal gas over it which has been previously cooled to the same temperature in order directly to separate all the condensable constituents, the charcoal becomes charged with the gaseous hydrocarbons and allows the hydrogen and carbonic oxid to escape. On heating the charcoal it evolves these concentrated and gaseous hydrocarbon vapors. It is also possible so to cool the charcoal and the mixed gas passing through it, that a practical separation of gases widely differing in their boiling points may be obtained. As an instance of this, the most volatile constituents of the air hydrogen, neon and helium are very imperfectly absorbed in charcoal when cooled to $-180°$ C., so that they are greatly concentrated in that portion of the air which is not condensed by the charcoal. If such uncondensed gas be pumped out of the vessel containing the cooled charcoal, the hydrogen, helium and neon will be separated from the bulk of the other constituents of the air.

When the object is to separate the less volatile gases of air known as krypton and xenon, the mass of charcoal cooled to the temperature of liquid air is exposed for a long time to a current of air. On allowing the temperature to rise as previously explained, the charcoal gives off gas richer in oxygen than nitrogen. The gas left in the charcoal about the ordinary temperature, can be got out by heating and pumping and this gas, after separating carbonic acid and volatile organic matter contains the krypton and xenon, together with nitrogen and oxygen from which mixture the two first named gases may be separated by liquefaction and fractionation in the usual manner.

Instead of allowing the gases or vapors absorbed in the cooled charcoal to expand to the ordinary atmospheric pressure the operation of heating may be conducted in closed vessels when the gases will be obtained under pressure, and can be so stored for use.

Having thus described the nature of my said invention, and the best means of carrying the same into practical effect, I claim:—

1. The method of separating gases or vapors which boil at temperatures below $0°$ C. by absorbing some of the constituents of the mixture, which method consists in exposing the mixture to charcoal cooled to a temperature below $0°$ C. approximately equal to the boiling point of the gas to be absorbed, and removing the gases that remain unabsorbed.

2. The method of separating gases or vapors which boil at temperatures below $0°$ C. by absorbing some of the constituents of the mixture, which method consists in exposing the mixture to charcoal cooled to a temperature below $0°$ C. approximately equal to the boiling point of that gas among the gases to be absorbed which has the lowest boiling point, then slowly raising the temperature of the charcoal and collecting separately the gases expelled therefrom as the temperature rises.

In testimony whereof I have signed my name to this specification in the presence of two subscribing witnesses.

JAMES DEWAR.

Witnesses:
   JOSEPH MILLARD,
   T. J. OSMAN.